E. J. SAMMIS.
BREAD MIXER CABINET.
APPLICATION FILED JUNE 22, 1912.

1,074,470.

Patented Sept. 30, 1913.

Witnesses
J. C. Simpson
J. A. Bucch.

Inventor
E. J. Sammis.
By Chandler & Chandler
Attorneys

UNITED STATES PATENT OFFICE.

EMMA J. SAMMIS, OF NORWALK, OHIO.

BREAD-MIXER CABINET.

1,074,470.  Specification of Letters Patent.  Patented Sept. 30, 1913.

Application filed June 22, 1912. Serial No. 705,301.

*To all whom it may concern:*

Be it known that I, EMMA J. SAMMIS, a citizen of the United States, residing at Norwalk, in the county of Huron, State of Ohio, have invented certain new and useful Improvements in Bread-Mixer Cabinets; and I do hereby declare the following to be a full, clear, and exact description of the invention, such as will enable others skilled in the art to which it appertains to make and use the same.

The present invention has relation to certain new and useful improvements in bread mixers and dough raising cabinets and the primary purpose of the invention is to construct a device of this character in a simple and novel manner so that the dough can be maintained at a uniform temperature after the mixing operation, and so that after the dough is mixed, the cabinet may then be closed and the dough caused to rise at the proper height without the necessity for frequent inspections and liability to become sour.

With the above and other objects in view, the invention consists of certain combinations and arrangements of parts as will be hereinafter more fully described and claimed, it being a still further object to provide a device which will not be likely to get out of working order.

Figure 1:
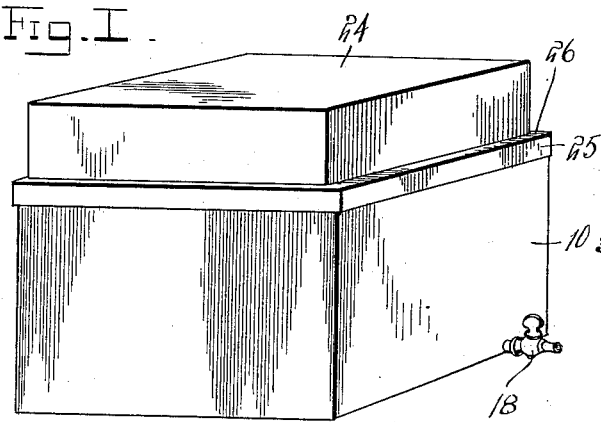
Figure 2:
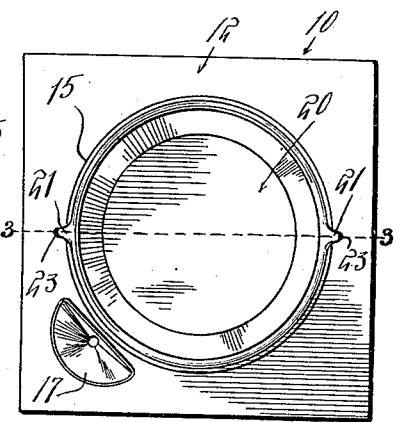
Figure 3:
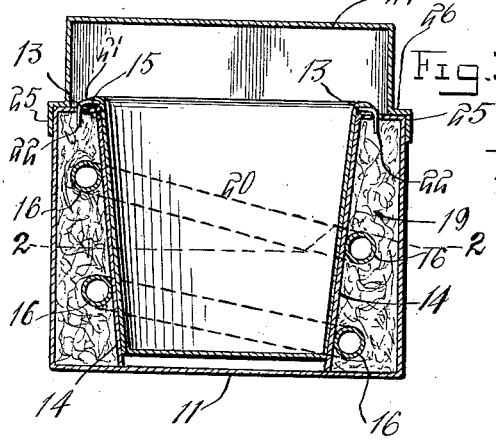
Figure 4:
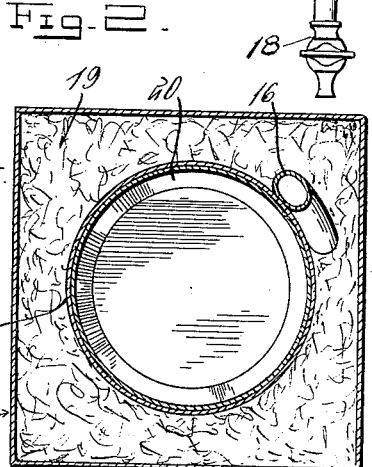
Figure 5:
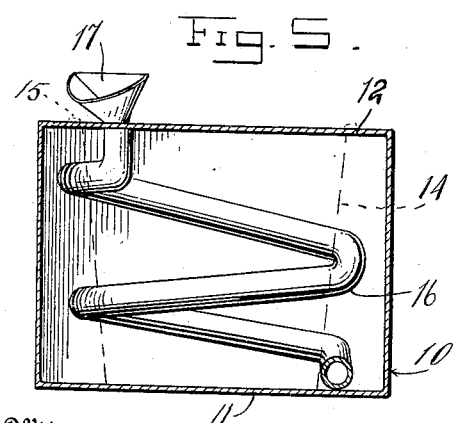
Figure 6:
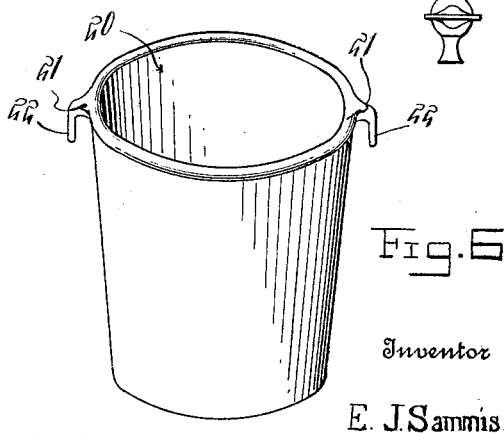

Figure 1 is a perspective view of the device. Fig. 2 is a top plan view thereof with the cover removed. Fig. 3 is a cross sectional view with the cover attached, the section being taken on the line 3—3 of Fig. 2. Fig. 4 is a sectional view of the device on the line 2—2 of Fig. 3. Fig. 5 is an elevational view of the heating coil engaged around the lining, the latter being shown in dotted lines, the casing and lower end of the coil being shown in vertical section. Fig. 6 is a detail perspective view of the removable receptacle in which the dough is mixed.

As illustrated, the device is shown as comprising a substantially rectangular casing 10 formed of metal of the required kind, the same having a bottom wall 11 and a top wall 12 provided with a central circular opening 13. A compartment forming partition 14 is fitted centrally in the casing, its top or surrounding edge being secured to the adjacent inner edge of the opening by an inturned flange 15, and it will be observed that the inner compartment thus provided is tapered toward its bottom which also constitutes the bottom of the casing and of the outer compartment or space.

A heating device pipe 16 is coiled approximately twice around the lining 14, one end thereof being attached to a stationary funnel 17 secured to the top wall of the casing adjacent to the opening or lining and adapted for feeding hot water through the pipe to distribute the heat uniformly through the cabinet, at a relatively low temperature, for the proper raising of the dough. The lower or discharge end of the pipe communicates with the drain cock 18 at one side of the casing so that the coils may be supplied with warm or hot water when the same becomes cool. However, in order to retain the water supply in the coils at the required temperature for a period sufficient to the proper raising of the quantity of dough which the device may accommodate, the interior space between the casing and the lining is filled with asbestos which is indicated by the numeral 19 which also surrounds the coil and retains the water and interior of the cabinet at an even temperature at all times.

Fitted within the lining is a mixing or kneading pan or receptacle 20 which has its rim or upper edge reinforced by a wire 21 which at diametrically opposite points is directed outwardly and downwardly to provide depending fingers or hooks 22 which are engageable through similarly related openings 23 in the top wall 12 of the casing or cabinet immediately outwardly of the lining whereby the pan or receptacle is held from rotation and displacement and can be readily removed and replaced when desired.

A cover 24 is provided for the cabinet, the same being of rectangular form and of reduced size relative to the cabinet or casing thereof proper but having an enlarged or flanged lower portion 25 which engages over the casing to support the top wall of the cover spaced above the casing by means of a surrounding shoulder 26 produced by said flanged portions whereby sufficient space is allowed between the cover and the top of the pan or receptacle for the proper raising of the dough therein.

It is also evident that the device may be supported in any desired manner, according to its particular use for bakeries or households and by reason of the fact, that the interior of the cabinet may be maintained in a practically uniform temperature for a predetermined period, it is possible to very effectually secure the rising of the dough without the same becoming lumpy or sour, while the simplicity of the structure permits the same to be cleaned and kept in an extremely sanitary condition at all times.

Having thus described my invention what I claim is:

In a bread raiser, a casing, a downwardly converging partition in the casing and combining therewith to form an inner compartment and an outer compartment surrounding said inner compartment, a receptacle fitted snugly within the inner compartment, and means within the outer compartment for distributing heat over the surface of said partition, and thereby allowing the heat to be conducted and distributed into and through the contents of the inner receptacle.

In testimony whereof, I affix my signature, in presence of two witnesses.

EMMA J. SAMMIS.

Witnesses:
LEONA CAMP,
DON J. YOUNG.

Copies of this patent may be obtained for five cents each, by addressing the "Commissioner of Patents, Washington, D. C."